United States Patent [19]

O'Brien

[11] Patent Number: 5,037,265

[45] Date of Patent: Aug. 6, 1991

[54] METHOD AND MEANS FOR LIFTING LATERAL FILE CABINETS

[76] Inventor: George M. O'Brien, 2633 Club Meadow Dr., Garland, Tex. 75043

[21] Appl. No.: 535,646

[22] Filed: Jun. 11, 1990

[51] Int. Cl.⁵ .............................................. B65G 67/02
[52] U.S. Cl. ..................................... 414/373; 14/72.5; 193/35 R; 414/345; 414/572; 414/786
[58] Field of Search .............. 414/340, 345, 373, 389, 414/398, 400, 572, 786; 193/35 R, 42; 14/72.5

[56] References Cited

U.S. PATENT DOCUMENTS

| | | | |
|---|---|---|---|
| 1,103,505 | 7/1914 | Grant | 193/35 R |
| 1,285,394 | 11/1918 | Robinson | 193/35 R X |
| 1,476,871 | 12/1923 | Bledsoe | 193/35 R |
| 1,495,339 | 5/1924 | Maher | 414/572 |
| 1,708,854 | 4/1929 | Stahlhut | 193/35 R X |
| 2,208,208 | 7/1940 | Brooks | 193/35 R |
| 2,888,130 | 5/1959 | Mousel | 414/398 X |
| 3,220,527 | 11/1965 | Curtis | 193/35 R |
| 3,913,758 | 10/1975 | Faircloth et al. | 193/35 R X |
| 3,954,192 | 5/1976 | Watts | 414/398 |
| 4,517,698 | 5/1985 | Lamp'l et al. | 14/72.5 |
| 4,606,690 | 8/1986 | Svendsen | 414/400 X |
| 4,930,967 | 6/1990 | Dovidauskas | 414/373 |

Primary Examiner—David A. Bucci
Attorney, Agent, or Firm—Robert G. Boydston

[57] ABSTRACT

A lift roller conveyor for rapid manually lifting a heavy rectilinear object, particularly a lateral file cabinet, from a floor surface onto a four-wheel dolly and for lowering such an object from a four-wheel dolly to a floor surface, is provided in a roller conveyor having an inclinded and a flat plane along which the object can be moved manually. Movement of the object along the conveyor rollers up or down the inclined plane effects a change of the elevation of the object "relative to the floor surface and the upper surface of the four-wheel dolly".

7 Claims, 2 Drawing Sheets

METHOD AND MEANS FOR LIFTING LATERAL FILE CABINETS

BACKGROUND OF THE INVENTION

This invention relates to labor saving devices for the movement of heavy objects, particularly to devices for lifting and movement of lateral file cabinets from place to place or onto and from truck transportation means.

Lateral file cabinets having pull out shelves that slide on roller tracks mounted in a cabinet frame are widely used in modern business offices. A typical lateral file cabinet has two or more slide or roller track mounted shelves vertically disposed one over the other and arranged to move out of the cabinet to a side of the cabinet frame for insertion and removal of individual files. Such file cabinets are often preferred over traditional vertical file cabinets having file drawers mounted on slide or roller tracks for movement out of an end of the cabinet for use. Lateral file cabinets often provide space saving and access advantages over such traditional file cabinets.

Movement of file cabinets is often required either within an office building manually or from building to building on a moving van or truck. Vertical file cabinets typically have a depth of thirty inches or less, a width of eighteen inches or less and a height of six feet or less. The cabinets are constructed of sheet metal over a relatively rigid steel frame. Such cabinets can be lifted and moved with relative ease by one person using a manual two wheel dolly. If weight reduction is necessary, entire drawers with contents intact can be removed and transported separately.

Lateral file cabinets are typically twenty-four to forth-eight inches in length, sixteen to twenty inches wide and thirty to seventy-two inches or more in height These cabinets are also constructed of sheet metal over a steel frame. However, the open side required for the laterally slidable file shelves results in a less rigid cabinet structure than that of the vertical file cabinets. Care must exercised in moving these lateral file cabinets, particularly fully loaded cabinets, because the steel frame can easily distorted, causing permanent bending of the slides or roller tracks and track supports. Because file shelves are typically not removable, files and other shelf contents must be individually removed if weight reduction is desired to avoid distortion of the frame during lifting and moving. Removal of individual files or other shelf contents to reduce the weight greatly increases the labor expense and time required to move a lateral file cabinet. Elimination of the contents removal step is desirable. But the greater length and less rigid construction of lateral file cabinets makes lifting and movement of fully loaded cabinets by use of two-wheel dollies impractical. A loaded file cabinet cannot be railed or carried on such a dolly without frame distortion.

One solution for movement of fully loaded lateral file cabinets is provided by a portable crane having a vacuum pump and suction cup on a hydraulic powered arm for lifting an entire lateral file onto or from a four-wheel dolly. The top surface of the lateral file cabinet is gripped by the suction cups and the entire cabinet is lifted by the hydraulic powered arm. Such a portable crane is expensive and of such size as to be unweildy in many offices, even to the point of being too large to use in cases of limited space around the cabinet. The expense of outfitting a moving crew with such a crane, the great amount of time required to move a cabinet with such a crane and the space occupied in the moving truck by the crane are economic disadvantages. Lifting a cabinet from the top in such manner can distort the frame of some cabinets and say damage the sheet metal top. A means of lifting and moving fully loaded lateral file cabinets with inexpensive, time-saving and safe manual means is clearly desirable.

OBJECTS OF THE INVENTION

It is, therefore, a principal object of this invention to provide a method and a manual means for rapidly lifting a fully loaded lateral file cabinet of any conventional size onto, and for lowering such cabinet from, a four-wheeled dolly.

It is also an object to provide such a means that is inexpensive to acquire, operate and maintain A further object of the invention is to provide such means in a portable, compact configuration.

Another object is to provide in such method and by such means for lifting, lowering and movement of a fully loaded lateral file cabinet without danger of applying a torque to the cabinet structure.

SUMMARY OF THE INVENTION

The objects are achieved in a lateral file cabinet lifting means constructed of rigid structural members carrying an inclined plane formed by a series of parallel cylindrical rollers and a method of lifting lateral file cabinets onto, as well as lowering the file cabinets from, four-wheeled dollies. The inclined plane may continue with a flat platform of additional parallel rollers. The height of the platform and width of the rollers is such that a four-wheeled dolly can fit under an edge for transfer of cabinet to dolly platform.

DETAILED DESCRIPTION OF THE PREFERRED

EMBODIMENT OF THE DRAWING AND METHOD OF USE

Figure 1:
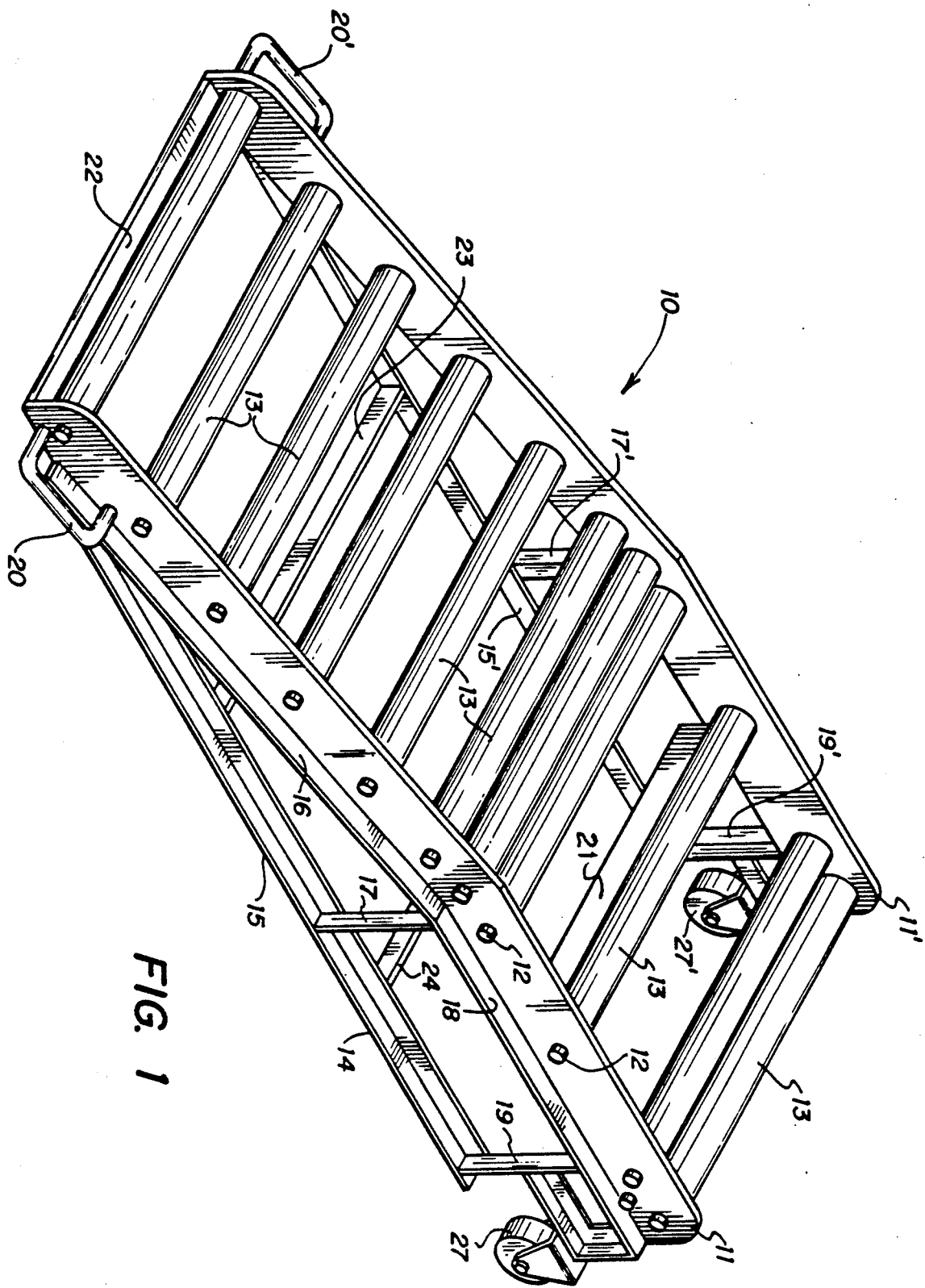
FIG. 1 is a perspective view of a lateral file cabinet lifting means.
Figure 3:
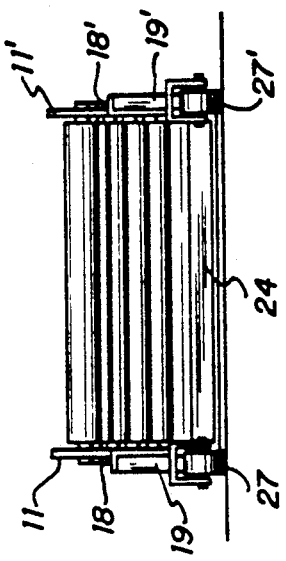
FIG. 3 is end elevation view of the lateral file cabinet lifting means.
Figure 2:
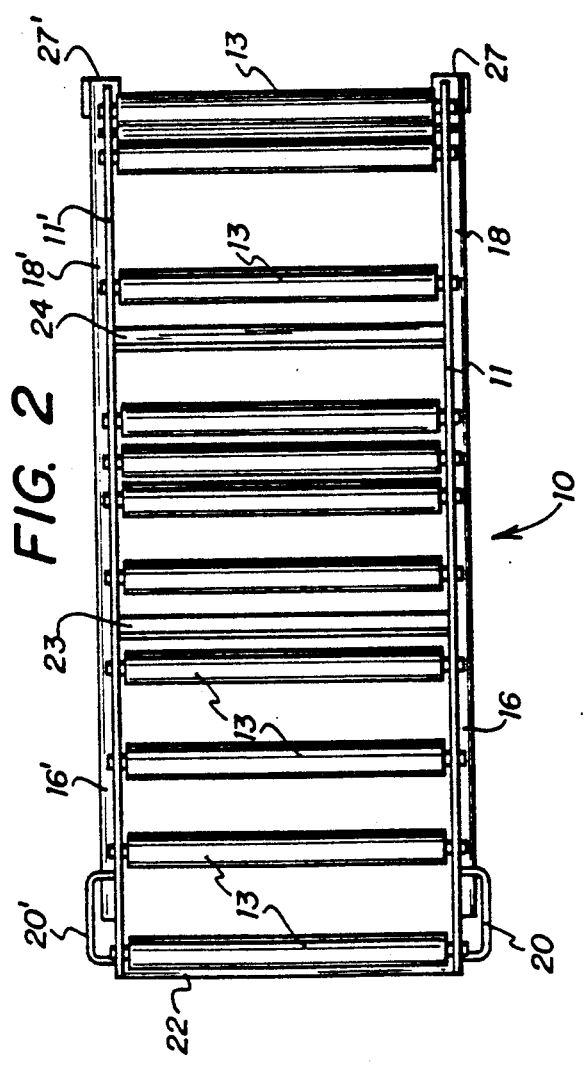
FIG. 2 is top plan view of the lateral file cabinet lifting means.

The lateral file cabinet lifting means 10 of FIG. 1, FIG. 2 and FIG. 3 is comprised of two parallel roller support members 11 and 11', disposed eighteen to twenty-four inches apart, each having a series of through holes 12 for mounting of rotatable cylindrical platform rollers 13. A rigid structural frame 14 is partially formed by elongate base member 15, inclined member 16, intermediate upright support member 17, horizontal member 18, end upright support member 19, intermediate support crossmember 21 and base crossmembers 22, 23 and 24, all of such members being welded or otherwise firmly affixed one to another at the appropriate places of intersection. An opposed like set of members 15', 16', 17' (not shown), 18' and 19' are affixed one to another and to the opposite ends of intermediate support crossmember 21 and of base crossmembers 22, 23 and 24 to complete the rigid structural frame 14.

Roller support members 11 and 11' are welded or otherwise firmly affixed to inclined plane members 16 and 16' and to horizontal members 18 and 18', such members 11 and 11' being formed with an inclined portion and a horizontal portion to follow the obtuse angle formed by the frame 14. Cylindrical members 13 are disposed between roller support members 11 and 11' thereby forming an inclined plane and horizontal platform conveyor type lateral file cabinet lifting means 10 along which a lateral file cabinet 25 can easily be moved from one end of the loading means 10 to the other end.

Figure 4:
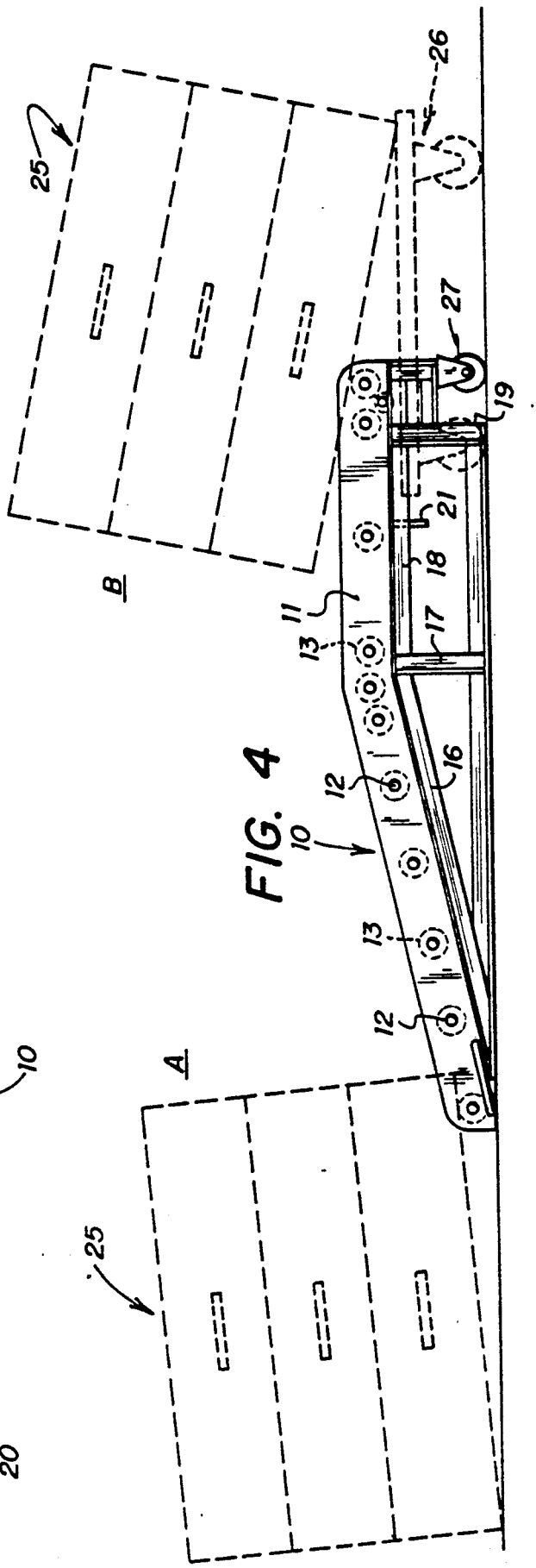
FIG. 4. is side elevation view of the lateral file cabinet lifting means with a later file cabinet shown in two lifting/lowering positions, including the loading onto or unloading from a four-wheeled dolly according to the method disclosed and claimed.

The lateral file cabinet lifting means 10 is shown in FIG. 4 positioned under an end of a lateral file cabinet 25, that has been manually lifted a few inches for positioning the means 10 partially thereunder. The method of use of the invention is to push the lateral file cabinet from position A up the inclined portion and onto the horizontal platform portion of the lifting means A four-wheeled dolly 26 is positioned partially under the horizontal platform portion of the lifting means 10 so that the lateral file cabinet 25 can be pushed along the rollers 13 and off the end of the lifting means 10 onto the four-wheel dolly 24 as shown in position B. Intermediate support member 21 serves as a stop to position the four wheel dolly 26 under the platform and of the lifting means 10.

The four-wheel dolly 26 carrying the lateral file cabinet 23 can then rolled to the desired location in another part of the office or onto a moving van. To unload the lateral file cabinet 25 from the dolly 26 a reverse procedure is employed by raising an end of the lateral file cabinet 25 onto the first roller 13 of the horizontal platform end of the lifting means 10 as in position B. The four-wheel dolly 26 and lateral file cabinet 25 are then pushed toward the lifting means 10 with the dolly 26 rolling under and the lateral file cabinet 25 moving along the rollers 13 onto the platform end of the lifting means 10. The lateral file cabinet 25 is then pushed down the inclined portion and onto the floor. The lateral file cabinet 25 remains well supported throughout the entire operation, even when fully loaded with files or other contents, and no torquing occurs to distort the framework of the cabinet 25.

Hand grips 20 and 20' are provided for operator convenience to raise an end of an unloaded lateral file cabinet lifting means 10 and moving it from place to place by rolling on castor wheels 27 and 27'.

Whereas this invention is herein illustrated and described with respect to a particular embodiment, it should be realized that various changes may be made without departing from the essential contributions to the art made by the teachings hereof.

I claim:

1. A manual lifting device for loading a lateral file cabinet having file shelves or movable drawers arranged for access from a longer side of such cabinet onto a four-wheel dolly and for unloading such a lateral file cabinet from a four wheel dolly comprising:
   a) a rigid frame supporting a pair of roller support members disposed parallel one to another;
   b) a series of rotatable cylindrical rollers disposed between the roller support members with each of such rollers rottably mounted on and extending between said support members;
   c) an inclined plane formed by apart of the series of rollers terminating at an elevated level plane part formed by a remaining part of the series of rollers in continuity with the inclined plane; and
   d) a rectilinear space under the elevated level plane part, open at a outboard end of the elevated platform, for positioning a four-wheel dolly partially under the elevated level plane part.

2. The manual lifting device of claim 1, wherein a pair of wheels are mounted to the frame below the outboard end of the elevated level plane part and a handle is affixed to each outside face of the frame at at lower end of the inclined plane part to facilitate portability from place to place.

3. A method for manually lifting a heavy object from a floor onto a dolly and for lowering a heavy object from a dolly onto a floor, comprising:
   a) placing inclined plane conveyor adjacent to an end of the object,
   b) manually lifting an end of the object onto a lower end of the inclined plane conveyor,
   c) pushing the object onto and up the inclined plane conveyor to a fixed elevated level plane part of the inclined plane conveyor,
   d) placing a dolly partially under the level plane elevated part of the inclined plane conveyor, and
   e) pushing the object from the level plane part of the inclined plane conveyor onto the dolly while moving the dolly in a direction away from the inclined plane conveyor.

4. The method of claim 3 wherein the inclined plane conveyor is comprised of a series o rotatably mounted cylindrical rollers mounted on a rigid frame.

5. The method of claim 3 wherein the heavy object is a lateral cabinet having file drawers or shelves arranged for access from a longer side of such cabinet.

6. The method of claim 3 where the dolly is a four-wheel rectangular platform dolly.

7. A method of manually lowering a lateral file cabinet from a four-wheel dolly to a floor surface comprising;
   a) placing a four-wheel dolly carrying a lateral file cabinet into a position adjacent to an elevated level plane part of an inclined plane conveyor having an inclined part and an elevated level plane part,
   b) lifting an end to the lateral file cabinet onto a first roller of the elevated level plane part of the inclined plane conveyor,
   c) pushing the dolly toward and under the elevated level plane part of the conveyor,
   d) pushing the lateral file cabinet toward and onto the elevated level plane part of the inclined plane conveyor,
   e) pushing the lateral file cabinet along the elevated level plane part and down the inclined part of the inclined plane conveyor to a lowest roller of the inclined part and into contact with a floor surface; and
   f) removing the inclined plane conveyor from under the lateral file cabinet while maintaining contact between the lateral file cabinet and the floor surface thereby lowering the lateral file cabinet onto the floor surface.

* * * * *